United States Patent
Katz et al.

(10) Patent No.: US 11,836,794 B2
(45) Date of Patent: Dec. 5, 2023

(54) CRISIS PREDICTION BASED ON PERSISTENCE HOMOLOGY OF DATA

(71) Applicant: S&P Global Inc., New York, NY (US)

(72) Inventors: Yuri Katz, Island Park, NY (US); Alain Biem, New York, NY (US)

(73) Assignee: S&P Global Inc., New York, NY (US)

( * ) Notice: Subject to any disclaimer, the term of this patent is extended or adjusted under 35 U.S.C. 154(b) by 803 days.

(21) Appl. No.: 16/937,943

(22) Filed: Jul. 24, 2020

(65) Prior Publication Data
US 2022/0027989 A1    Jan. 27, 2022

(51) Int. Cl.
  *G06Q 40/04*    (2012.01)
  *G06F 17/15*    (2006.01)

(52) U.S. Cl.
  CPC .......... *G06Q 40/04* (2013.01); *G06F 17/153* (2013.01)

(58) Field of Classification Search
  CPC ....... G06Q 40/00; G06Q 40/04; G06F 17/153
  See application file for complete search history.

(56) References Cited

U.S. PATENT DOCUMENTS

| | | | |
|---|---|---|---|
| 10,579,932 B1* | 3/2020 | Cantrell | G06F 16/24568 |
| 11,605,124 B2* | 3/2023 | Cella | H04L 9/0637 |
| 11,625,792 B2* | 4/2023 | Cella | H04L 9/0637 |
| | | | 705/38 |
| 11,645,724 B2* | 5/2023 | Cella | G16Y 10/50 |
| | | | 705/4 |
| 11,657,461 B2* | 5/2023 | Cella | G06Q 30/018 |
| | | | 705/38 |

* cited by examiner

*Primary Examiner* — Hosuk Song
(74) *Attorney, Agent, or Firm* — Yee & Associates, P.C.

(57) ABSTRACT

A method is provided that comprises collecting financial data points and normalizing the data points into a time series. The time series is merged into aggregates according to sliding windows that comprise different time periods and a sliding step increment. A periodic change in an increasing and convex transformation is computed for each aggregate, and multi-dimensional time-delayed coordinate embedding is applied to each aggregate. The sliding windows are applied to the time-delayed aggregates, and time series of variances and point clouds are derived within each sliding window. Persistence homologies and time series norms are computed for the point clouds, and the time series norms are correlated with the time series of variances. A warning of an impending financial crisis is output if the correlation of the time series norms with the time series of variances exceeds a predefined threshold.

20 Claims, 6 Drawing Sheets

CRISIS PREDICTION BASED ON PERSISTENCE HOMOLOGY OF DATA

BACKGROUND INFORMATION

1. Field

The present disclosure relates generally to an improved computing system, and more specifically to a method for predicting approaching market crises based on the computation of persistence homology for whole economic system as well as for specific economic sectors.

2. Background

Bonds and other debt securities carry the risk that the borrower will not replay the debt or its interest. Because debt securities often have lengthy terms to maturity, as much as 30 years, it is difficult for investors to make reliable estimates about the risk of default over the life of the instrument.

A credit default swap (CDS) is an instrument related to a debt security in which the buyer of the CDS to make periodic payments to the seller until the maturity date of the underlying debt security. In exchange, the seller of the CDS promises to pay the buyer, in the event the debt issuer defaults, all premiums and the interest that would have been paid up to the maturity date. The price of a CDS is referred to as its "spread." The default risk of a debt issuer determines its CDS spread.

Tipping points in financial markets are often preceded by growing variability and rising auto- and cross-correlation in time series. This behavior might become detectable only for a short time interval relative to a period of observation, making early detection of growing instability by conventional statistical methods a notoriously difficult problem.

Therefore, it would be desirable to have a method and apparatus that take into account at least some of the issues discussed above, as well as other possible issues.

SUMMARY

An illustrative embodiment provides a computer-implemented method that comprises collecting financial data points and normalizing the data points into a time series. The time series is merged into aggregates according to sliding windows that comprise different time periods and a sliding step increment. A periodic change in an increasing and convex transformation is computed for each aggregate, and multi-dimensional time-delayed coordinate embedding is applied to each aggregate. The sliding windows are applied to the time-delayed aggregates, and time series of variances and point clouds are derived within each sliding window. Persistence homologies and time series norms are computed for the point clouds, and the time series norms are correlated with the time series of variances. A warning of an impending financial crisis is output if the correlation of the time series norms with the time series of variances exceeds a predefined threshold.

Another illustrative embodiment provides a system comprising a storage device configured to store program instructions and one or more processors operably connected to the storage device and configured to execute the program instructions to cause the system to: collect a number of financial data points; normalize the data points into a time series; merge the time series into a number of aggregates according to a number of sliding windows, wherein the sliding windows comprise a number of different time periods and a sliding step increment; compute a periodic change in an increasing and convex transformation for each aggregate; apply multi-dimensional time-delayed coordinate embedding to each aggregate; apply the sliding windows to the time-delayed aggregates; derive a number of time series of variances and point clouds within each sliding window; compute a number of persistence homologies and time series norms for the point clouds; correlate the time series norms with the time series of variances; and output a warning of an impending financial crisis if the correlation of the time series norms with the time series of variances exceeds a predefined threshold.

Another illustrative embodiment provides a computer program product comprising a computer-readable storage medium having program instructions embodied thereon to perform the steps of: collecting a number of financial data points; normalizing the data points into a time series; merging the time series into a number of aggregates according to a number of sliding windows, wherein the sliding windows comprise a number of different time periods and a sliding step increment; computing a periodic change in an increasing and convex transformation for each aggregate; applying multi-dimensional time-delayed coordinate embedding to each aggregate; applying the sliding windows to the time-delayed aggregates; deriving a number of time series of variances and point clouds within each sliding window; computing a number of persistence homologies and time series norms for the point clouds; correlating the time series norms with the time series of variances; and outputting a warning of an impending financial crisis if the correlation of the time series norms with the time series of variances exceeds a predefined threshold.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. The illustrative embodiments recognize and take into account that an endogenous runaway process can shift the state of a complex system towards a tipping point. In other words, the system can become unstable, and a small exogenous disturbance can trigger an abrupt change in the system. Such critical transitions have been observed in a variety of complex systems ranging from, e.g., traffic jams, ecosystems, climate, and financial markets.

The illustrative embodiments also recognize and take into account that theoretical models of critical transitions have shown that variability in a system increases, whereas the rate of relaxation decreases, as the system approaches a tipping point. However, the illustrative embodiments also recognize and take into account that the rising instability in a system can be difficult to detect using conventional statistical methods because these changes might become visible for only a short time interval.

The illustrative embodiments provide an early warning system that utilizes persistence homology for predicting an approaching financial crisis. The illustrative embodiments apply topological analysis to credits default swap (CDS) spreads to predict financial crises. The method of the illustrative embodiments extends the primary mathematical tool of topological data analysis—persistent homology—to time series. Persistence homology is rooted in computational algebraic topology. All topological features of a dataset are considered and assigned weights according to their persistence. Time-resolved topological data analysis enables the capture of temporal changes in the shape of time series observed in dynamic, chaotic, as well as stochastic systems.

The time-resolved topological data analysis of the illustrative embodiments can be used to infer imminent changes cause by endogenous market forces leading to system instability. By applying sliding window techniques and quantifying the evolution of markets, the derived time series of $L^1$-norms and their variance sharply increase prior to the peak of a financial crisis. Notably, CDS spreads produce earlier warning signals than equity markets.

Figure 1:
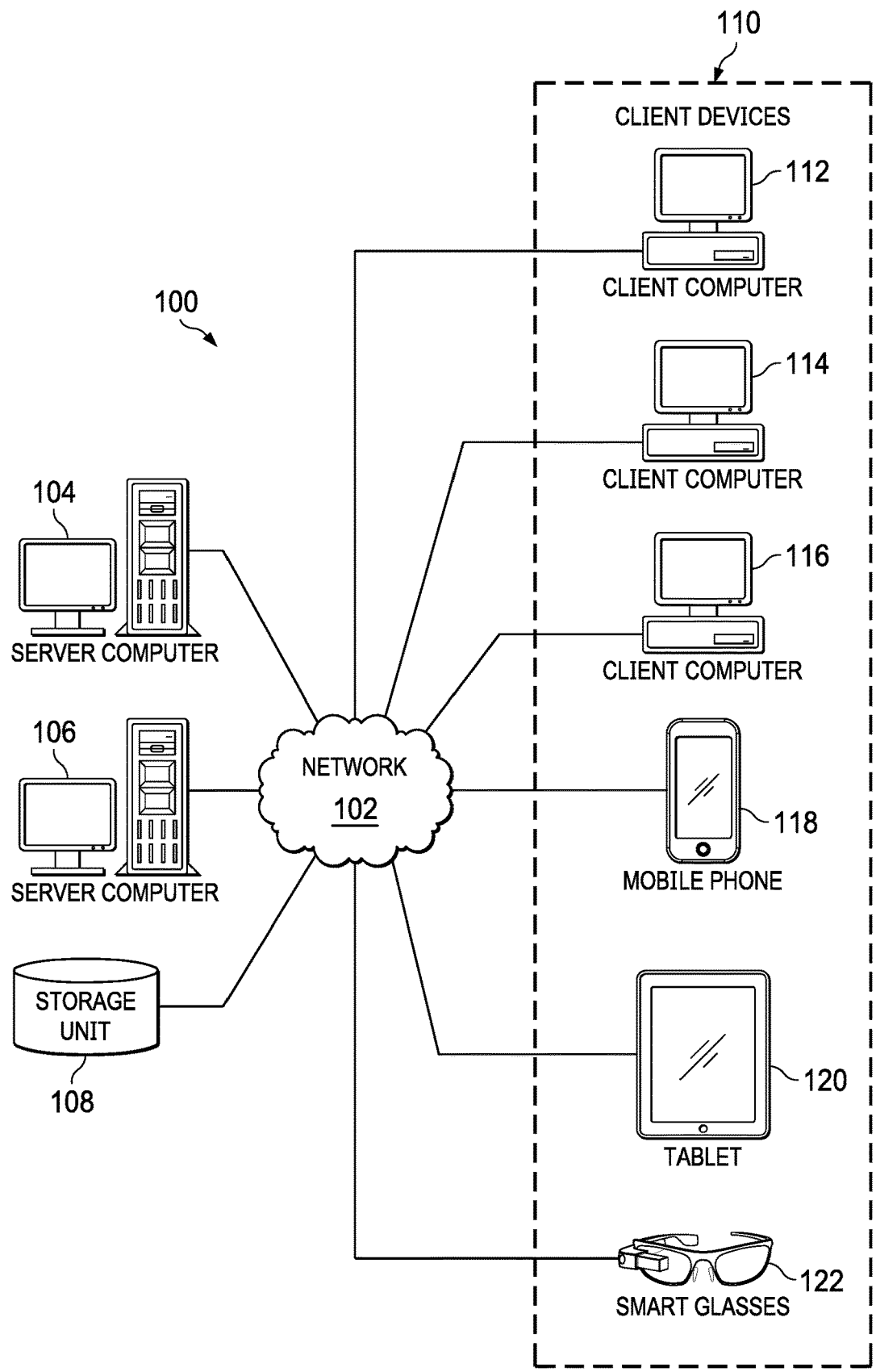
FIG. 1 is a pictorial representation of a network of data processing systems in which illustrative embodiments may be implemented.

With reference to FIG. 1, a pictorial representation of a network of data processing systems is depicted in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 might include connections, such as wire, wireless communication links, or fiber optic cables.

In the depicted example, server computer 104 and server computer 106 connect to network 102 along with storage unit 108. In addition, client devices 110 connect to network 102. In the depicted example, server computer 104 provides information, such as boot files, operating system images, and applications to client devices 110. Client devices 110 can be, for example, computers, workstations, or network computers. As depicted, client devices 110 include client computers 112, 114, and 116. Client devices 110 can also include other types of client devices such as mobile phone 118, tablet computer 120, and smart glasses 122.

In this illustrative example, server computer 104, server computer 106, storage unit 108, and client devices 110 are network devices that connect to network 102 in which network 102 is the communications media for these network devices. Some or all of client devices 110 may form an Internet of things (IoT) in which these physical devices can connect to network 102 and exchange information with each other over network 102.

Client devices 110 are clients to server computer 104 in this example. Network data processing system 100 may include additional server computers, client computers, and other devices not shown. Client devices 110 connect to network 102 utilizing at least one of wired, optical fiber, or wireless connections.

Program code located in network data processing system 100 can be stored on a computer-recordable storage medium and downloaded to a data processing system or other device for use. For example, the program code can be stored on a computer-recordable storage medium on server computer 104 and downloaded to client devices 110 over network 102 for use on client devices 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented using a number of different types of networks. For example, network 102 can be comprised of at least one of the Internet, an intranet, a local area network (LAN), a metropolitan area network (MAN), or a wide area network (WAN). FIG. 1 is intended as an example, and not as an architectural limitation for the different illustrative embodiments.

Figure 2:
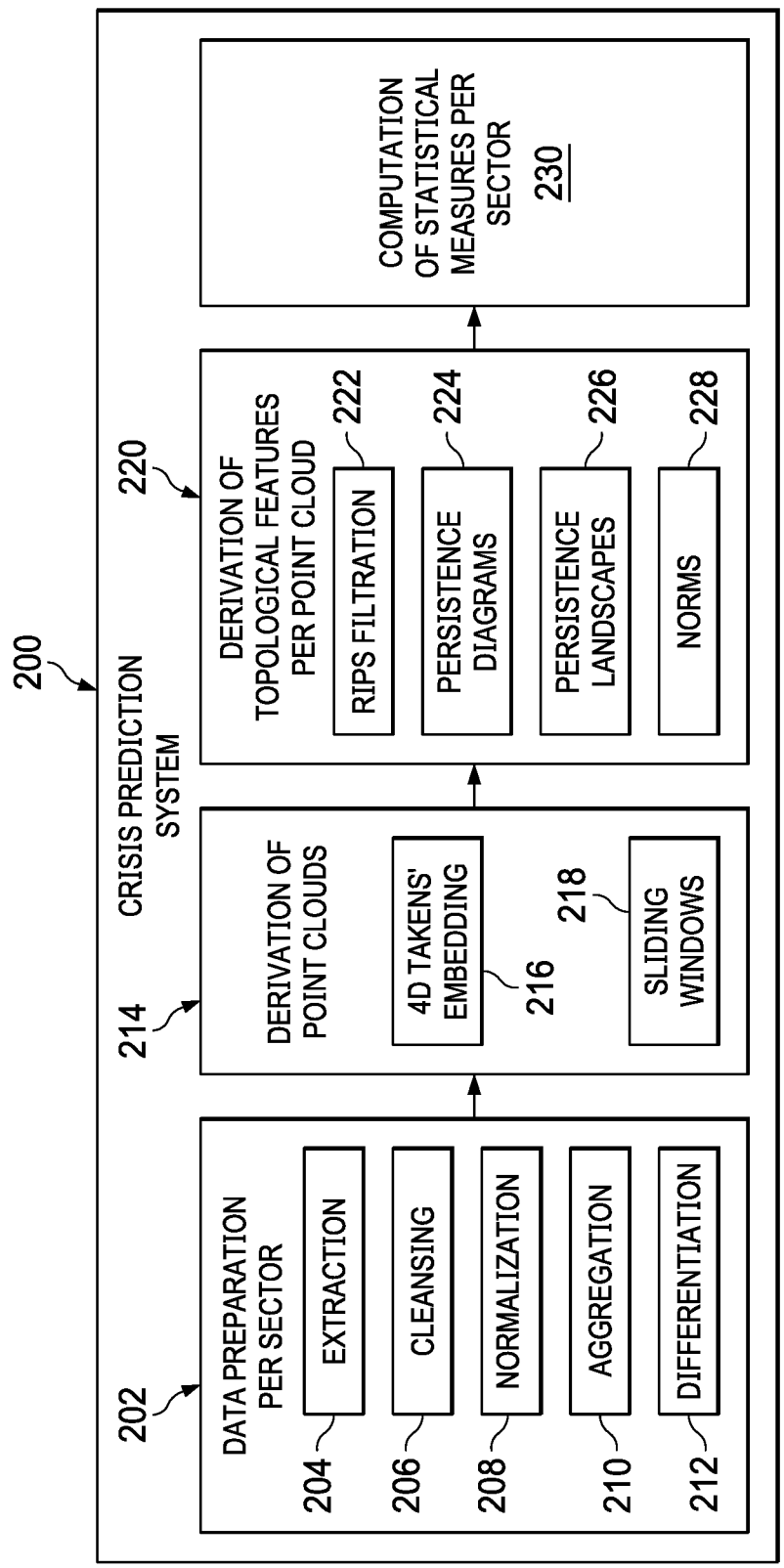
FIG. 2 depicts a block diagram of a crisis prediction system in accordance with an illustrative embodiment.

FIG. 2 depicts a block diagram of a crisis prediction system in accordance with an illustrative embodiment. Crisis prediction system 200 might be implemented in data processing system 100 in FIG. 1 and provides a computational pipeline for evaluating market data.

Crisis prediction system 200 comprises data preparation per industry sector 202, derivation of ordered sets of point clouds 214, derivation of topological features per point cloud 220, and computation of statistical measures per sector 230 that can indicate an impending crisis in a sector.

Data preparation 202 comprises extraction 204, cleansing 206, normalization 208, aggregation 210, and differentiation 212 of sector data.

Derivation of ordered sets of point clouds 214 might comprise four-dimensional Takens' embedding 216 and sliding windows 218 applied to the sector data.

Derivation of topological features 220 might comprise Rips filtration 222, persistence diagrams 224, persistence landscapes 226, and computation of norms 228 for each point cloud.

After sector data preparation 202, derivation of point clouds 214 from the data, and deriving topological features 220 of the point clouds, the system 200 can compute statistical measure per sector 230 that allow prediction of impending crises.

Crisis prediction system 200 can be implemented in software, hardware, firmware or a combination thereof. When software is used, the operations performed by crisis prediction system 200 can be implemented in program code configured to run on hardware, such as a processor unit. When firmware is used, the operations performed by crisis prediction system 200 can be implemented in program code and data and stored in persistent memory to run on a processor unit. When hardware is employed, the hardware may include circuits that operate to perform the operations in crisis prediction system 200.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

These components can be located in a computer system, which is a physical hardware system and includes one or more data processing systems. When more than one data processing system is present in the computer system, those data processing systems are in communication with each other using a communications medium. The communications medium can be a network. The data processing systems can be selected from at least one of a computer, a server computer, a tablet computer, or some other suitable data processing system.

The method of the illustrative embodiments employ CDS spreads for analysis because this asset type is expected to be sensitive to changing market conditions. CDSs provide insurance against default on a bond or other type of security. A drop in a borrower's equity price increases the probability of default. Conversely, growing risk of default can negatively affect stock price, creating a positive feedback loop, leading to a high sensitivity of CDS spreads to credit risk. Furthermore, recent evidence suggests CDS spreads are driven primarily by systemic market factors rather than individual firms' default risk.

Figure 3:
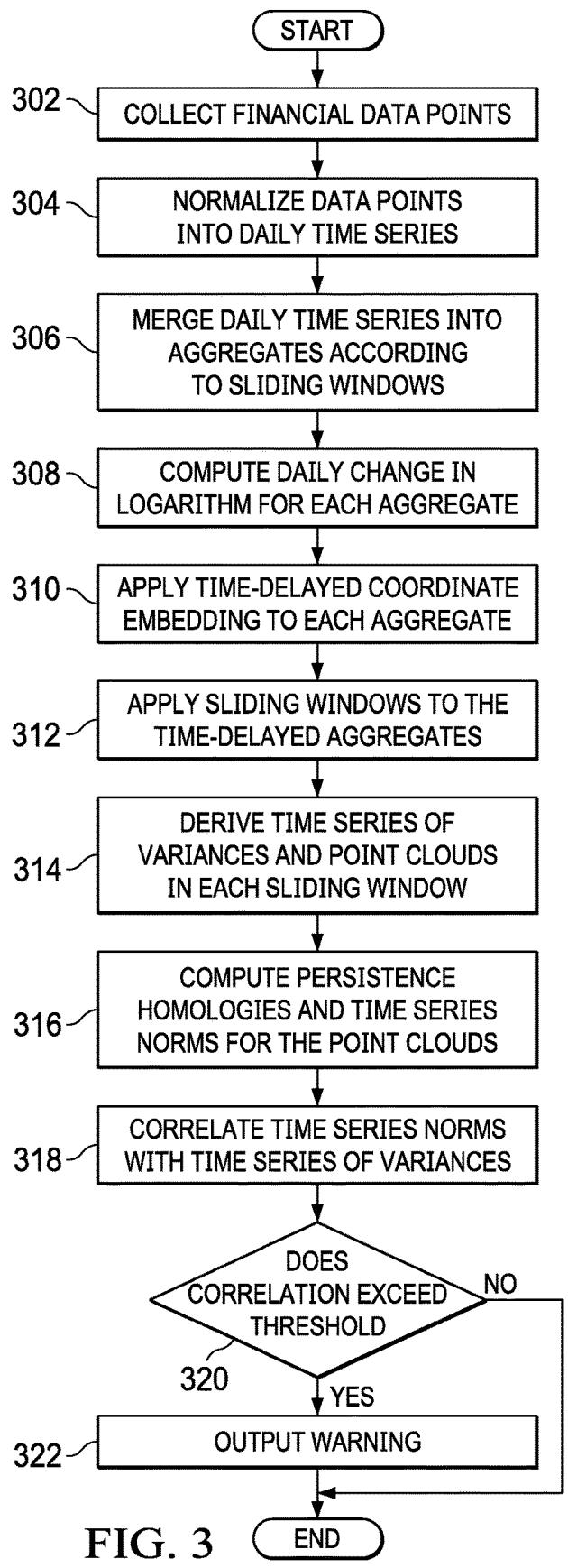
FIG. 3 depicts a flowchart illustrating a process for predicting financial crises in accordance with an illustrative embodiment.

FIG. 3 depicts a flowchart illustrating a process for predicting financial crises in accordance with an illustrative embodiment. The process in FIG. 3 can be implemented in hardware, software, or both. When implemented in software, the process can take the form of program code that is run by one of more processor units located in one or more hardware devices in one or more computer systems. Process 300 might be implemented in crisis prediction system 200 shown in FIG. 2.

Process 300 begins by collecting a number of financial data points (step 302). The financial data points might be for a defined industry sector. The financial data points might comprise credit default swap spreads, stock prices, or a combination of both.

Process 300 then normalizes the data points into a time series (step 304). The time series might be, e.g., daily, half-day, weekly, monthly, or other suitable time scale. The time series are merged into a number of index-like aggregates according to a number of sliding windows (step 306). The sliding windows comprise a number of different time periods and a sliding step increment.

For each index-like aggregate of time series, process 300 computes a change in its logarithm or in other increasing and convex transformation (step 308) and applies multi-dimensional, time-delayed coordinate embedding (step 310). The multi-dimensional time-delayed coordinate embedding might comprise a 4D Takens' embedding.

Process 300 then applies a number of sliding windows to the time-delayed aggregates (step 312).

Process 300 derives a number of time series of variances and point clouds within each sliding window (step 314). A Rips filtration algorithm and persistence diagram can be applied to the time series point clouds to calculate a number of Rips filtered time series point clouds. Process 300 then computes a number of persistence homologies and time series norms for the point clouds (step 316).

Process 300 correlates the time series norms are with the time series of variances (step 318) and determines if the correlation exceeds a predefined threshold (step 320).

If the correlation of the time series norms with the time series of variances exceeds the predefined threshold process 300 outputs a warning of an impending financial crises (step 322). If the initial data points collected in step 302 are for a specific industry sector the warning of a financial crisis is specific to the defined industry sector. Process 300 then ends.

Figure 4:
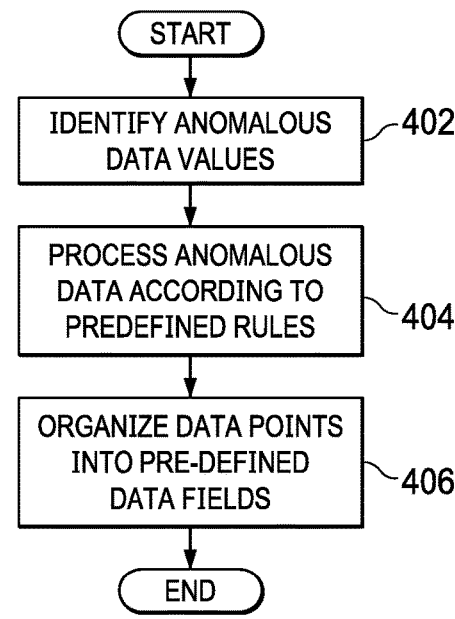
FIG. 4 depicts a flowchart illustrating a process for cleansing the daily time series of financial data points in accordance with an illustrative embodiment.

FIG. 4 depicts a flowchart illustrating a process for cleansing the daily time series of financial data points in accordance with an illustrative embodiment. The process in FIG. 4 can be implemented in hardware, software, or both. When implemented in software, the process can take the form of program code that is run by one of more processor units located in one or more hardware devices in one or more computer systems. Process 400 might be performed before step 304 in process 300.

Process 400 begins by identifying anomalous data values (step 402). These anomalous values are processed according to a number of pre-defined rules (step 404). The data points are then organized into a plurality of pre-defined data fields (step 406).

Figure 5A:
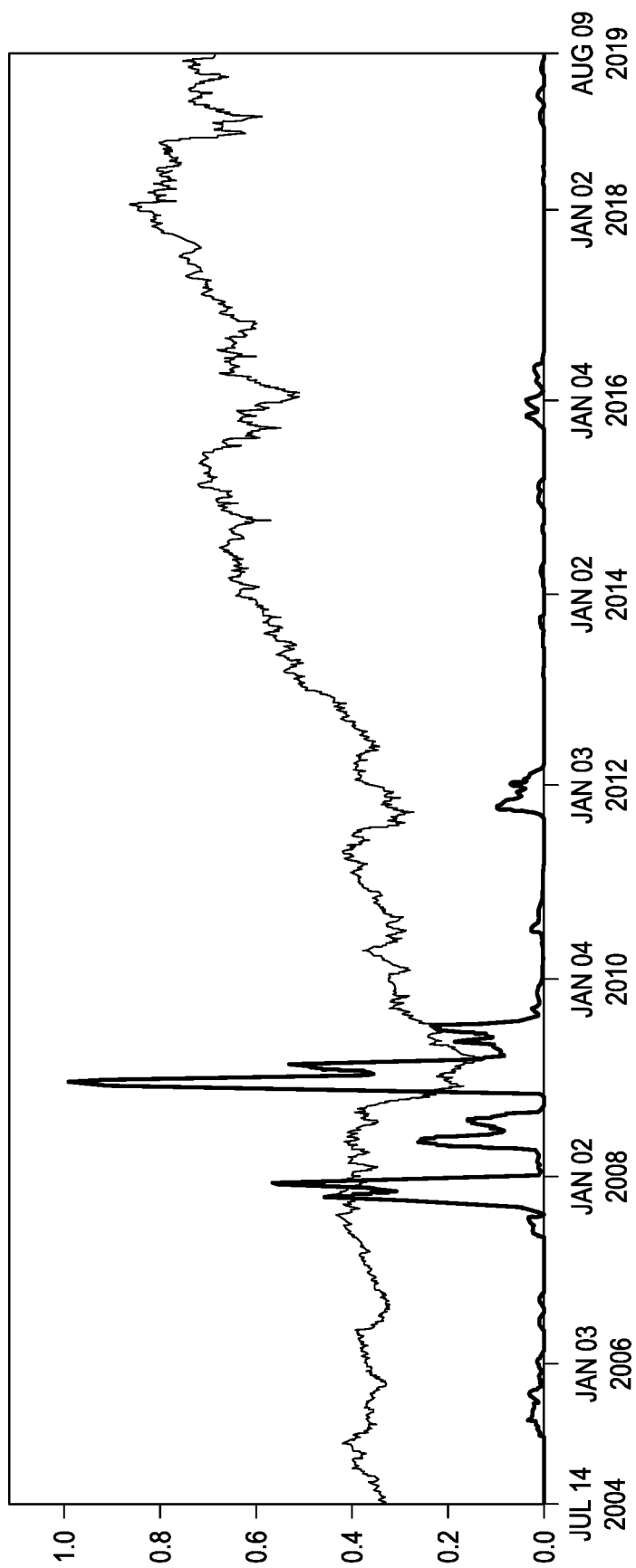
FIG. 5A depicts a graph illustrating stock prices compared to variances of $L^1$-norms derived from daily log-returns of CDS spreads in accordance with an illustrative embodiment.
Figure 5B:
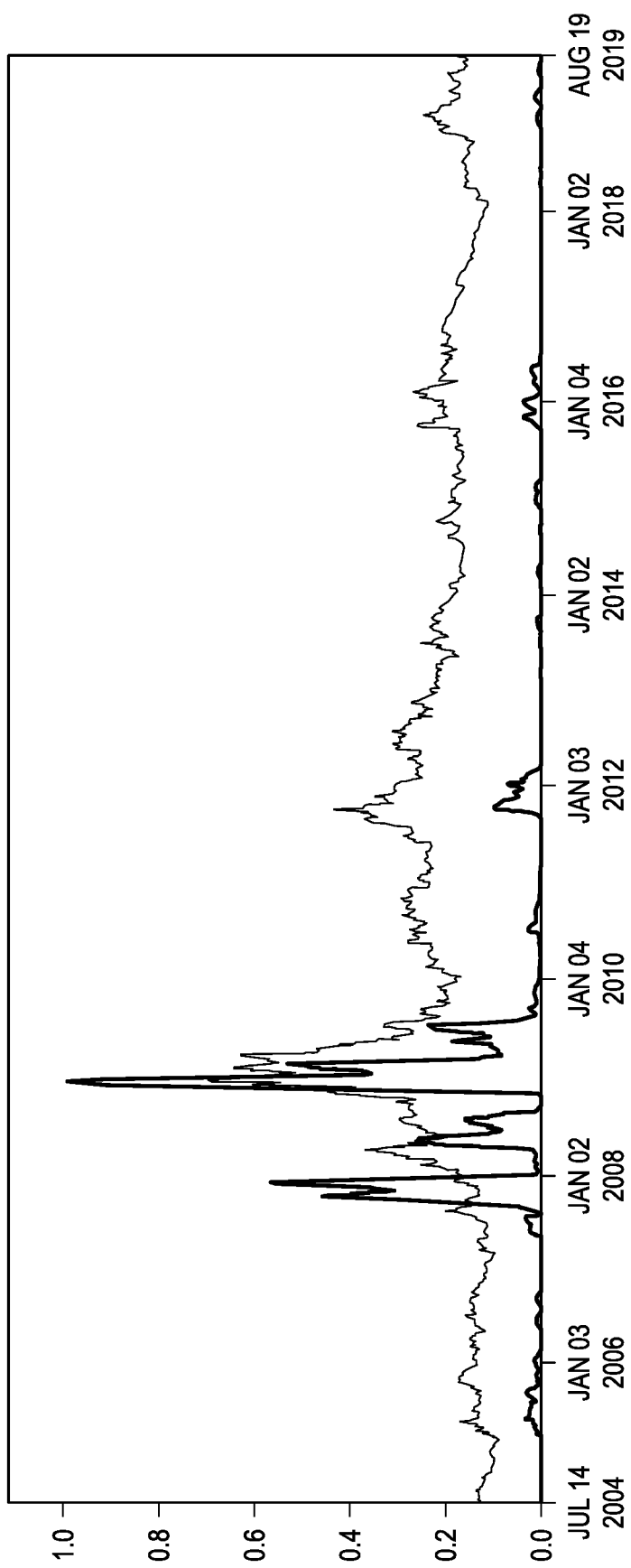
FIG. 5B depicts a graph illustrating CDS spreads compared to variances of $L^1$-norms derived from daily log-returns of CDS spreads in accordance with an illustrative embodiment.

FIG. 5A depicts a graph illustrating stock prices compared to variances of $L^1$-norms derived from daily log-returns of credit default swap spreads in accordance with an illustrative embodiment. In addition to daily log-returns, the illustrative embodiments can also be implemented using, e.g., monthly, weekly, half-day log-returns. FIG. 5B depicts a graph illustrating CDS spreads compared to variances of $L^1$-norms derived from daily log-returns of CDS spreads in accordance with an illustrative embodiment. Again, log-returns for other time scales can also be used.

Both FIGS. 5A and 5B depict time series over a period of approximately 15 years. As shown in both figures, the sharp surge in the variance of $L^1$-norms derived from the daily log-returns of aggregate CDS spreads happens prior to the drop in aggregated equity prices and the jump in values of aggregated CDS spreads.

In an embodiment, the variance of $L^1$-norms calculated at the sliding window of 50 trading days is shown to be robust to false alarms.

Figure 6:
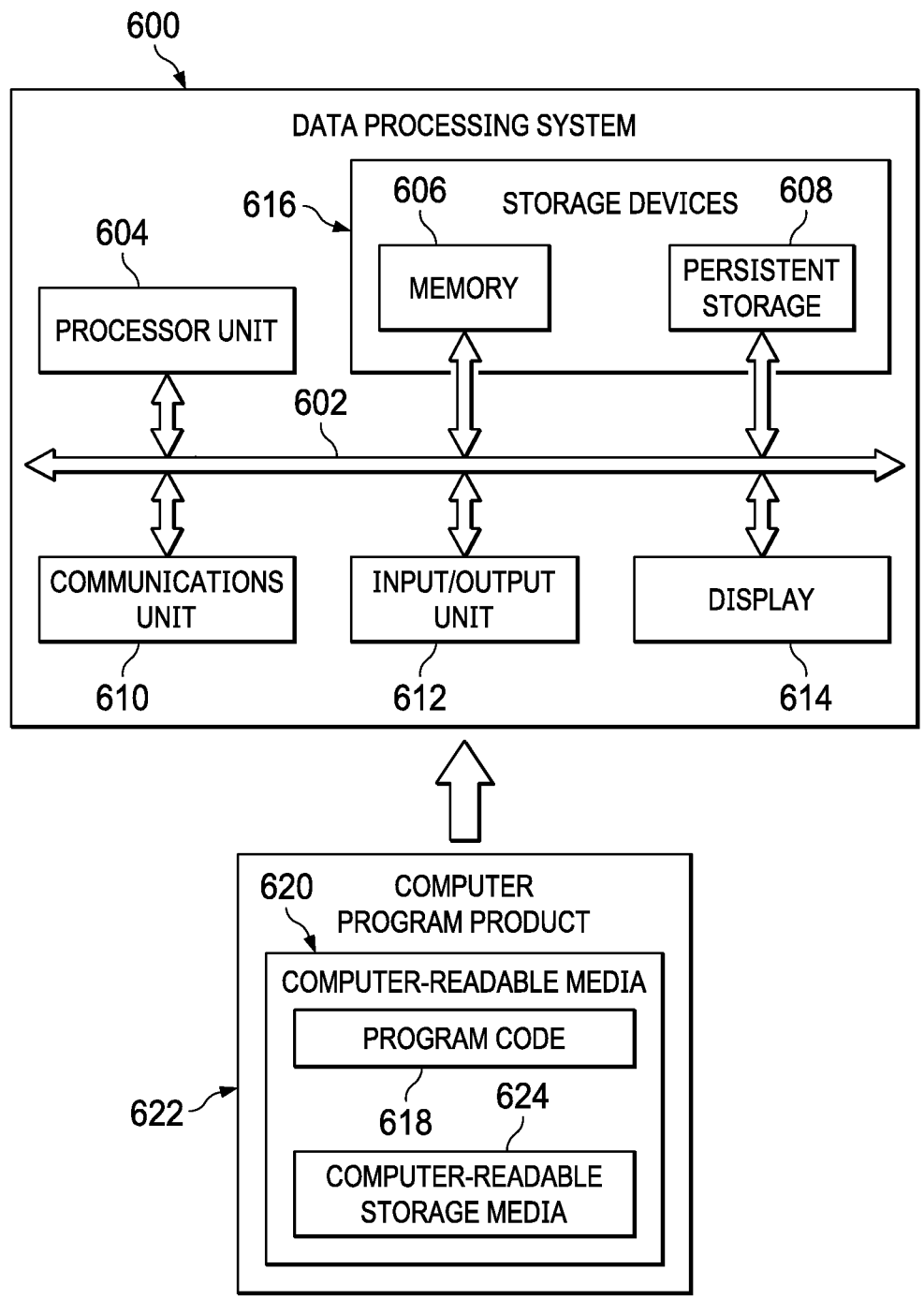
FIG. 6 is a block diagram of a data processing system in accordance with an illustrative embodiment.

Turning now to FIG. 6, a block diagram of a data processing system is depicted in accordance with an illustrative embodiment. Data processing system 600 can be used to implement server computer 104, server computer 106, client devices 110, in FIG. 1. Further, data processing system 700 can also be used to implement one more components in crisis prediction system 200 in Figure 2. In this illustrative example, data processing system 600 includes communications framework 602, which provides communications between processor unit 604, memory 606, persistent storage 608, communications unit 610, input/output (I/O) unit 612 and display 614. In this example, communications framework 602 takes the form of a bus system.

Processor unit 604 serves to execute instructions for software that can be loaded into memory 606. Processor unit 604 includes one or more processors. For example, processor unit 604 can be selected from at least one of a multicore processor, a central processing unit (CPU), a graphics processing unit (GPU), a physics processing unit (PPU), a digital signal processor (DSP), a network processor, or some other suitable type of processor.

Memory 606 and persistent storage 608 are examples of storage devices 616. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 616 may also be referred to as computer-readable storage devices in these illustrative examples. Memory 606, in these examples, can be, for example, a random-access memory or any other suitable volatile or non-volatile storage device. Persistent storage 608 may take various forms, depending on the particular implementation.

Persistent storage 608 may contain one or more components or devices. For example, persistent storage 608 can be a hard drive, a solid-state drive (SSD), a flash memory, a rewritable optical disk, a rewritable magnetic tape, or some combination of the above. The media used by persistent storage 608 also can be removable. For example, a removable hard drive can be used for persistent storage 608.

Communications unit 610, in these illustrative examples, provides for communications with other data processing systems or devices. In these illustrative examples, communications unit 610 is a network interface card.

Input/output unit 612 allows for input and output of data with other devices that can be connected to data processing system 600. For example, input/output unit 612 may provide a connection for user input through at least one of a keyboard, a mouse, or some other suitable input device. Further, input/output unit 612 may send output to a printer. Display 614 provides a mechanism to display information to a user.

Instructions for at least one of the operating system, applications, or programs can be located in storage devices 616, which are in communication with processor unit 604 through communications framework 602. The processes of the different embodiments can be performed by processor unit 604 using computer-implemented instructions, which may be located in a memory, such as memory 606.

These instructions are referred to as program code, computer usable program code, or computer-readable program code that can be read and executed by a processor in processor unit 604. The program code in the different embodiments can be embodied on different physical or computer-readable storage media, such as memory 606 or persistent storage 608.

Program code 618 is located in a functional form on computer-readable media 620 that is selectively removable and can be loaded onto or transferred to data processing system 600 for execution by processor unit 604. Program code 618 and computer-readable media 620 form computer program product 622 in these illustrative examples. In the illustrative example, computer-readable media 620 is computer-readable storage media 624.

In these illustrative examples, computer-readable storage media 624 is a physical or tangible storage device used to store program code 618 rather than a medium that propagates or transmits program code 618.

Alternatively, program code 618 can be transferred to data processing system 600 using a computer-readable signal media. The computer-readable signal media can be, for example, a propagated data signal containing program code 618. For example, the computer-readable signal media can be at least one of an electromagnetic signal, an optical signal, or any other suitable type of signal. These signals can be transmitted over connections, such as wireless connections, optical fiber cable, coaxial cable, a wire, or any other suitable type of connection.

Further, as used herein, "computer-readable media 620" can be singular or plural. For example, program code 618 can be located in computer-readable media 620 in the form of a single storage device or system. In another example, program code 618 can be located in computer-readable media 620 that is distributed in multiple data processing systems. In other words, some instructions in program code 618 can be located in one data processing system while other instructions in program code 618 can be located in a separate data processing system. For example, a portion of program code 618 can be located in computer-readable media 620 in a server computer while another portion of program code 618 can be located in computer-readable media 620 located in a set of client computers.

The different components illustrated for data processing system 600 are not meant to provide architectural limitations to the manner in which different embodiments can be implemented. The different illustrative embodiments can be implemented in a data processing system including components in addition to or in place of those illustrated for data processing system 600. Other components shown in FIG. 6 can be varied from the illustrative examples shown. The different embodiments can be implemented using any hardware device or system capable of running program code 618.

The description of the different illustrative embodiments has been presented for purposes of illustration and description and is not intended to be exhaustive or limited to the embodiments in the form disclosed. In some illustrative examples, one or more of the components may be incorporated in or otherwise form a portion of, another component. For example, the 606, or portions thereof, may be incorporated in processor unit 604 in some illustrative examples.

As used herein, "a number of," when used with reference to items, means one or more items. For example, "a number of different types of networks" is one or more different types of networks.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method comprising:
using a number of processors to perform the steps of:
    collecting a number of financial data points;
    normalizing the number of financial data points into a time series;
    merging the time series into a number of aggregates according to a number of sliding windows, wherein the number of sliding windows comprise a number of different time periods and a sliding step increment;
    computing a periodic change in an increasing and convex transformation for each aggregate;
    applying multi-dimensional time-delayed coordinate embedding to each aggregate;
    applying the number of sliding windows to the time-delayed coordinate embedded aggregates;
    deriving a number of time series of variances and a number of point clouds within each sliding window;
    computing a number of persistence homologies and time series norms for the number of point clouds;
    correlating the time series norms with the time series of variances; and
    outputting a warning of an impending financial crisis if the correlation of the time series norms with the time series of variances exceeds a predefined threshold.

2. The method of claim 1, further comprising applying a Rips filtration algorithm and persistence diagram to the number of point clouds to calculate a number of Rips filtered time series point clouds.

3. The method of claim 1, wherein the multi-dimensional time-delayed coordinate embedding comprises a 4D Takens' embedding.

4. The method of claim 1, further comprising cleansing a daily time series of financial data points by:
    identifying anomalous data values;
    processing the anomalous data values according to a number of pre-defined rules; and
    organizing the data points into a plurality of pre-defined data fields.

5. The method of claim 1, wherein the financial data points are from a defined industry sector, and wherein the warning of a financial crisis is specific to the defined industry sector.

6. The method of claim 1, wherein the financial data points comprise credit default swap spreads.

7. The method of claim 1, wherein the financial data points comprise stock prices.

8. A system, comprising:
a storage device configured to store program instructions; and
one or more processors operably connected to the storage device and configured to execute the program instructions to cause the system to:
    collect a number of financial data points;
    normalize the number of financial data points into a time series;
    merge the time series into a number of aggregates according to a number of sliding windows, wherein the number of sliding windows comprise a number of different time periods and a sliding step increment;
    compute a periodic change in an increasing and convex transformation for each aggregate;
    apply multi-dimensional time-delayed coordinate embedding to each aggregate;
    apply the number of sliding windows to the time-delayed coordinate embedded aggregates;
    derive a number of time series of variances and a number of within each sliding window;
    compute a number of persistence homologies and time series norms for the number of point clouds;
    correlate the time series norms with the time series of variances; and
    output a warning of an impending financial crisis if the correlation of the time series norms with the time series of variances exceeds a predefined threshold.

9. The system of claim 8, wherein the processors further execute instructions to apply a Rips filtration algorithm and persistence diagram to the number of point clouds to calculate a number of Rips filtered time series point clouds.

10. The system of claim 8, wherein the multi-dimensional time-delayed coordinate embedding comprises a 4D Takens' embedding.

11. The system of claim 8, wherein the processors further execute instructions to cleanse a daily time series of financial data points by:
  identifying anomalous data values;
  processing the anomalous data values according to a number of pre-defined rules; and
  organizing the data points into a plurality of pre-defined data fields.

12. The system of claim 8, wherein the financial data points are from a defined industry sector, and wherein the warning of a financial crisis is specific to the defined industry sector.

13. The system of claim 8, wherein the financial data points comprise credit default swap spreads.

14. The system of claim 8, wherein the financial data points comprise stock prices.

15. A computer program product, comprising:
  a computer-readable storage media having program instructions embodied thereon to perform the steps of:
  collecting a number of financial data points;
  normalizing the number of financial data points into a time series;
  merging the time series into a number of aggregates according to a number of sliding windows, wherein the number of sliding windows comprise a number of different time periods and a sliding step increment;
  computing a periodic change in an increasing and convex transformation for each aggregate;
  applying multi-dimensional time-delayed coordinate embedding to each aggregate;
  applying the number of sliding windows to the time-delayed coordinate embedded aggregates;
  deriving a number of time series of variances and a number of point clouds within each sliding window;
  computing a number of persistence homologies and time series norms for the number of point clouds;
  correlating the time series norms with the time series of variances; and
  outputting a warning of an impending financial crisis if the correlation of the time series norms with the time series of variances exceeds a predefined threshold.

16. The computer program product of claim 15, further comprising instructions for applying a Rips filtration algorithm and persistence diagram to the number of point clouds to calculate a number of Rips filtered time series point clouds.

17. The computer program product of claim 15, wherein the multi-dimensional time-delayed coordinate embedding comprises a 4D Takens' embedding.

18. The computer program product of claim 15, further comprising instructions for cleansing a daily time series of financial data points by:
  identifying anomalous data values;
  processing the anomalous data values according to a number of pre-defined rules; and
  organizing the data points into a plurality of pre-defined data fields.

19. The computer program product of claim 15, wherein the financial data points are from a defined industry sector, and wherein the warning of a financial crisis is specific to the defined industry sector.

20. The computer program product of claim 15, wherein the financial data points comprise at least one of:
  credit default swap spreads; or
  stock prices.

* * * * *